Jan. 27, 1942. G. C. UNGER, JR 2,271,446
METHOD OF AND MEANS FOR PURIFYING OR OTHERWISE TREATING FLUIDS
Filed Jan. 17, 1939 4 Sheets-Sheet 3
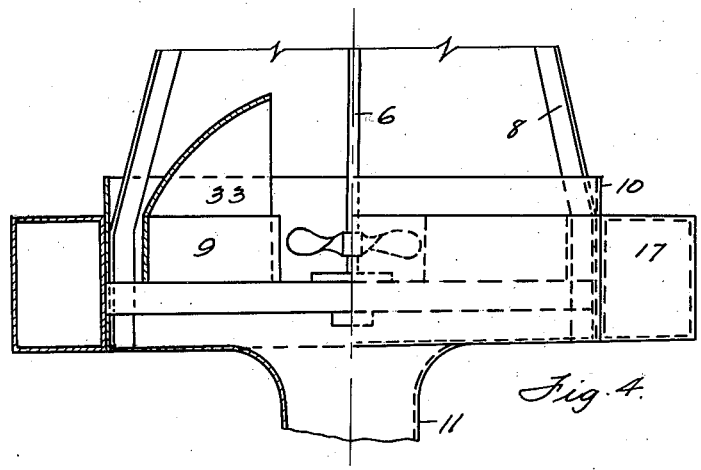
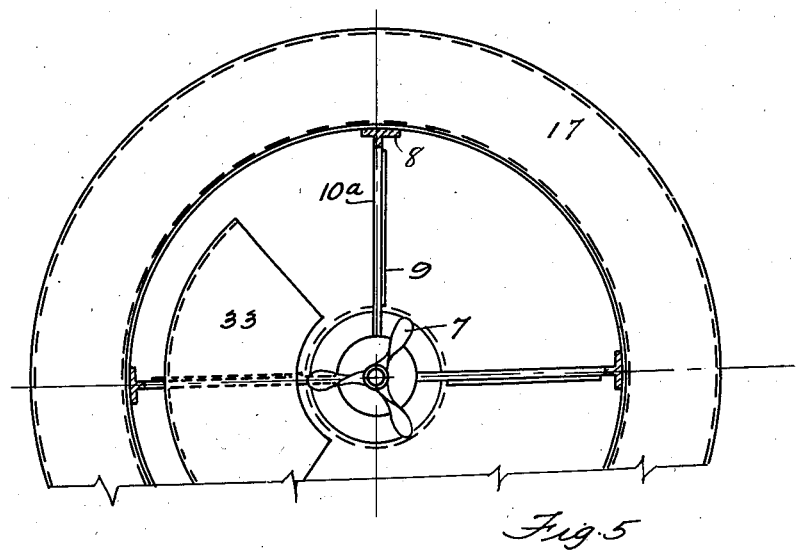
Gilbert C. Unger, Jr.
Inventor
By Shephard Campbell
Attorneys Jan. 27, 1942. G. C. UNGER, JR 2,271,446
METHOD OF AND MEANS FOR PURIFYING OR OTHERWISE TREATING FLUIDS
Filed Jan. 17, 1939 4 Sheets-Sheet 4

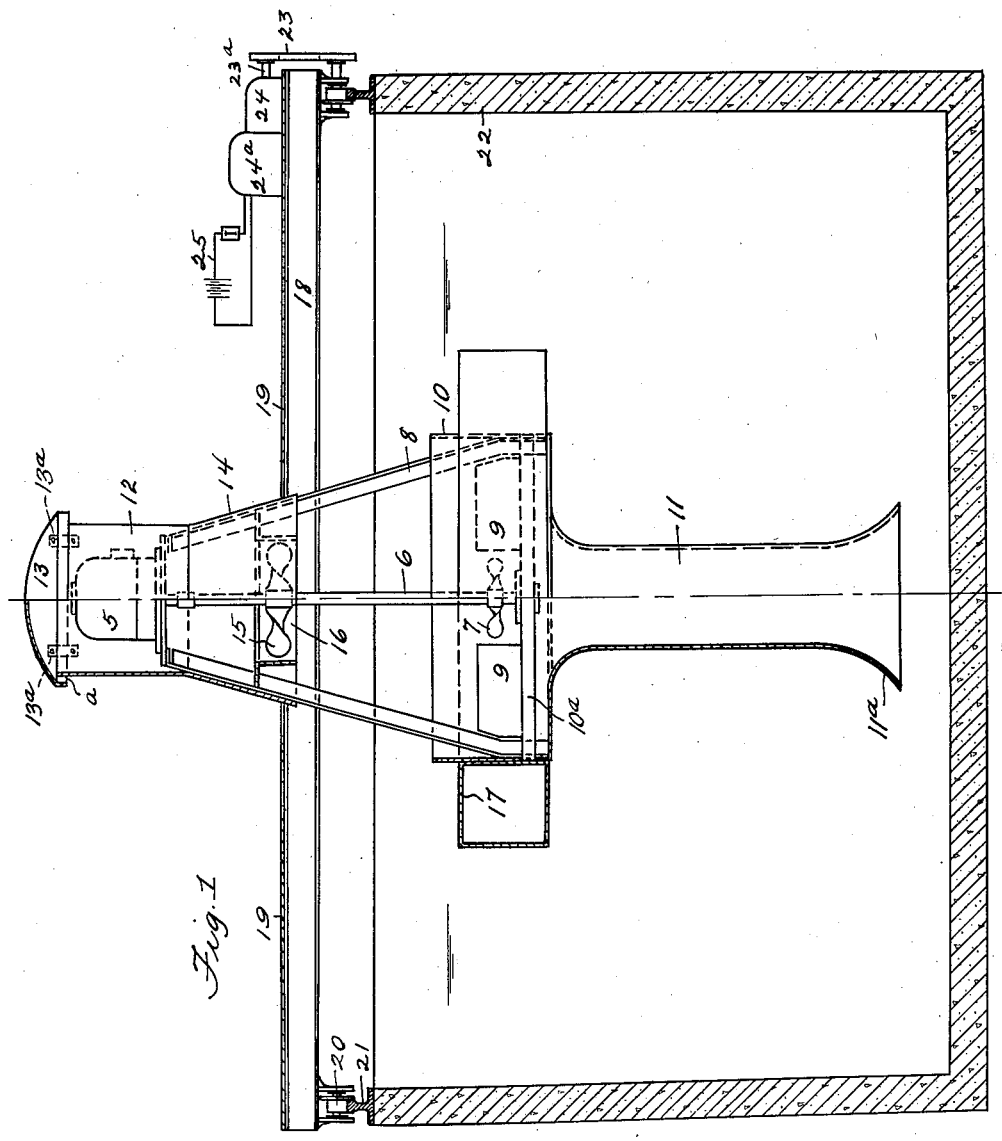

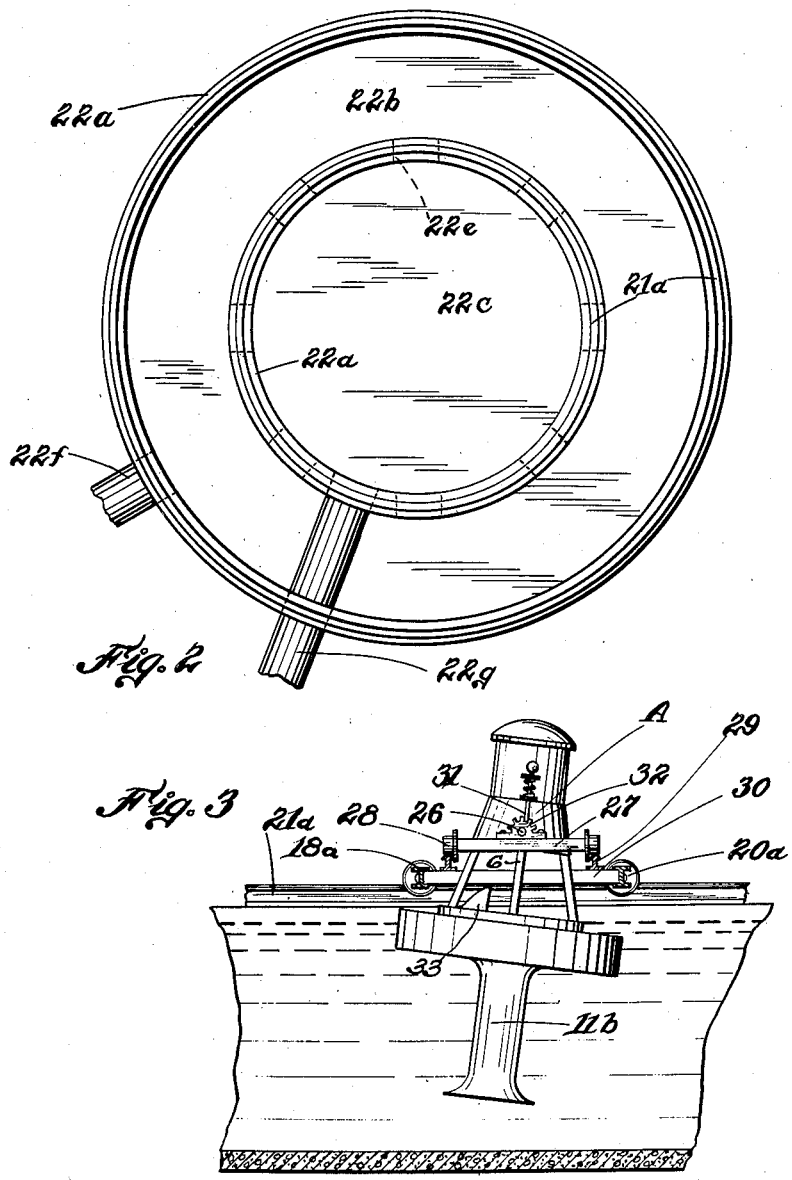

Gilbert C. Unger, Jr.
Inventor

Patented Jan. 27, 1942

2,271,446

UNITED STATES PATENT OFFICE 2,271,446

METHOD OF AND MEANS FOR PURIFYING OR OTHERWISE TREATING FLUIDS

Gilbert C. Unger, Jr., Louisville, Ky.

Application January 17, 1939, Serial No. 251,433

12 Claims. (Cl. 210—26)

This invention relates to a method of and means for aerating, agitating, and/or mixing bodies of liquids and also for bringing about prolonged periods of contact between air or other gases and such bodies of liquids. The liquid bodies to be treated may be, and usually are, relatively large bodies of liquid, such as sewage, water supplies of cities or towns, and the like. The apparatus of the present invention has a wide range of usefulness. It may be used to mix gases with liquids and/or to drive gases from liquids, to render water more suitable for domestic and commercial consumption, to render sewage and other waste liquids more susceptible to economical and efficient disposal, and to mix gases with large volumes of liquids, as in industrial processes where definite chemical reactions are effected by intimate contact.

Most of the existing devices for accomplishing the above named purposes with which I am familiar, have been located in a fixed position with relation to the bodies of liquid to be treated. This has imposed severe limitations upon the efficiency of the apparatus because of the difficulty of getting all of the liquid to be treated to flow into contacting relation to the agitating and aerating means.

Broadly speaking, the primary purpose of the present invention is to provide a very simple bodily traveling, agitating and/or aerating, or other fluid treating, means, so mounted in a tank of said liquid as to traverse the same and subject the entire content of the tank to efficient treatment, as hereinafter set forth.

A further object of the invention is to provide means for rendering the treating mechanism wholly or partly buoyant, so that it tends to float and thus becomes very easy of propulsion throughout the whole area to be traversed.

Under the present system of employing fixed position machines, a large number of individual units must be employed to avoid dead areas where little or no mixing of the liquid with air or other treating gases takes place. This results in stagnation, inefficiency, clogging deposits of solids, etc. Such dead areas are especially disadvantageous in the aeration tanks of sewage treatment plants, where some oxygen must be present in all portions of the body of the liquid at all times in order to prevent the setting up of anaerobic decomposition, which would be adverse to the carrying out of the process.

In my co-pending application Serial No. 218,000, now Patent 2,174,147 granted September 26, 1939, I have illustrated a liquid treatment unit consisting of a vertical shaft carrying a propeller disposed below the level of the liquid to force the liquid upwardly above the surface with somewhat violent ebullition, and a propeller located above the liquid level to simultaneously force downward upon the agitated liquid a current of air or other treating gas, according to the nature of the process being carried out.

In the particular form of the invention which I have chosen for illustration in the present application, I employ a unit similar to that of my application aforesaid but add thereto means for rendering the same wholly or partly buoyant and means for imparting bodily lateral travel to the same with respect to the body of liquid that is being treated.

In the accompanying drawings, in which like characters of reference designate corresponding parts throughout the several views:

Figure 1 is a vertical sectional view through a tank showing the treating unit mounted for bodily traveling movement along the walls of the tank under the influence of a mechanical propulsion means;

Fig. 2 is a plan view illustrating an annular treatment moat surrounding a central settling chamber;

Fig. 3 is a vertical section view taken at right angles to the position illustrated in Fig. 1 and showing means for mounting the apparatus for bodily tilting movement in and lateral bodily adjustment with respect to, the tank;

Fig. 4 is a view partly in side elevation and partly in vertical section through the body portion of the liquid aerating structure;

Fig. 5 is a horizontal sectional view of the structure illustrated in Fig. 3;

Figure 6:
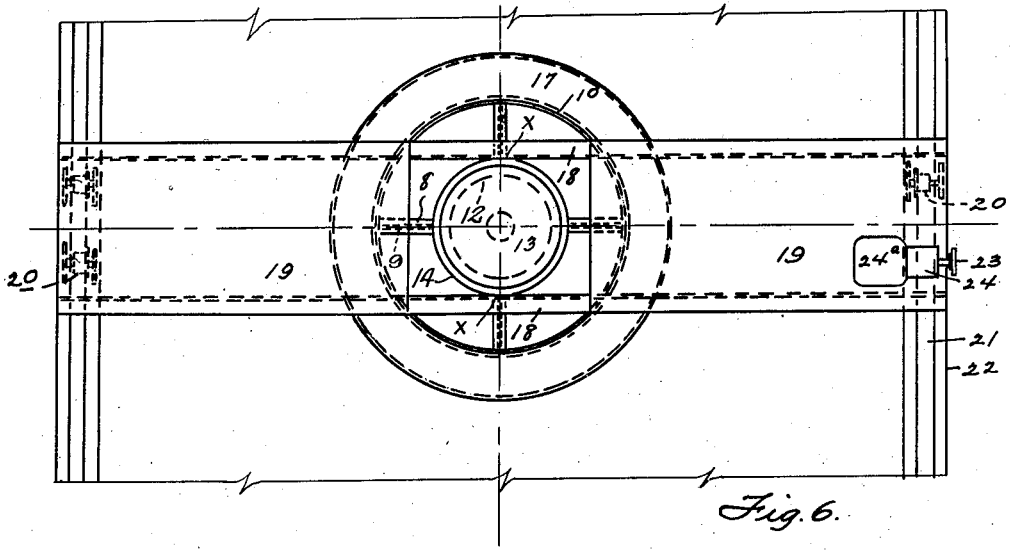
Fig. 6 is a plan view of the structure of Fig. 1.

Referring to the drawings and more particularly to Fig. 1, 5 designates an electric motor for driving a vertical shaft 6. A propeller 7, upon the shaft, is, when the device is in place, disposed below the liquid level and is adapted to force the liquid upwardly above the surface in violent ebullition. The motor 5 is supported upon a suitable frame which in this case comprises the legs or standards 8. Vanes 9 prevent the setting up of a mere whirlpool action by the propeller and aid in causing the liquid to be forced upwardly in the form of a truncated cone. The lower end of the shaft 6 is supported in a bearing carried by a spider comprising arms 10ª, and the vanes 9 are mounted upon these arms. These vanes lie outwardly of and in the plane of the propeller and thus prevent the energy of the propeller from being transformed into a mere whirling movement of the liquid. Thus the liquid is agitated and moved upwardly when it cannot move horizontally with the propeller.

A ring 10, secured to the frame and constituting a part thereof, lies outwardly of the vanes 9 and prevents the liquid from flowing directly laterally to the propeller 7, thus forcing this propeller to draw its supply through tube 11, having a bell mouth 11$^a$ at its lower end.

A hood 12, having a cap 13, houses the motor. An opening $a$, extending entirely around the hood 12 and formed by making the cap 13 somewhat larger than the hood, permits the entry of air into the upper portion of the hood. Suitable supporting straps 13$^a$ hold the cap 13 in spaced relation to the hood 12 in a manner common in many forms of ventilators. The lower portion of the hood consists of an apron 14, which is, in effect, a continuation of the hood, and which apron extends downwardly to a point below the level of a propeller 15.

This propeller is likewise mounted upon the shaft 6 and acts countercurrent to the propeller 7. Thus the propeller 15 functions to discharge air in a strong current and continuously downwardly upon the ebullient liquid that is being forced upwardly by the propeller 7. The propeller 15 is preferably located in a restricted portion 16 of the hood so that it will act to draw air through opening $a$ and thus pull it downwardly past motor 5.

So far, as has been described, the structure is substantially the same as that of my Patent No. 2,174,147, except for the tube 11. I wish to make it clear that this invention goes beyond the mere provision of any specific type of apparatus and is intended to include any structure mounted for bodily traveling movement with respect to the body of liquid upon which it operates and adapted to simultaneously agitate and additionally aerate or otherwise treat the same.

A buoyant chamber 17 surrounds and is secured to ring 10 and thus aids in floatingly mounting the whole structure. Consequently, the structure is rendered very easy of propulsion in the body of liquid.

Transversely extending beams 18 are tied together by foot plates 19, and these beams are mounted upon track wheels 20, adapted to travel upon track rails 21. These track rails are mounted upon the top of the tank 22. Any suitable and conventional means for supporting the frame 8 and associated parts from the beams 18 may be employed. For example, the apron 14 may be welded to the beams 18, as indicated at X in Fig. 6. One of the track wheels may have motion imparted thereto to bodily propel the whole structure through the medium of a driving chain or belt 23, said belt in turn being driven from the shaft 23$^a$ of a conventional reduction gear 24, constituting a part of a conventional electric motor 24$^a$.

An electric circuit for energizing said motor is indicated at 25 and includes a conventional limit and reverse switch I. These switches have acquired a distinct status in the art and are well known. They function when an apparatus has traveled a given distance in one direction to cause it to reverse, and thus set up an endless reciprocation of the driven part until the current is cut off.

By the construction described, the apparatus may be caused to travel back and forth along the wall of the tank 22. This tank may be a plain straight tank, or it may be an annular tank, such as that illustrated in Fig. 2, where the walls 22$^a$ form a treatment moat 22$^b$ between them, the inner wall in turn encircling a settling chamber 22$^c$. Track rails 21$^a$ upon the top of the walls of the annular tank correspond to the track rails 21 of Fig. 1, and serve the purpose of supporting the apparatus for travel around the said annular tank. Such travel could be under the influence of a motor such as 24$^a$, previously described, or it could be under the influence of the propulsive action brought into play when the apparatus is rocked upon its trunnions, as in Fig. 3, and as described with respect to said Fig. 3.

In the case of an annular tank, passages indicated at 22$^e$ provide means for permitting the passage of liquid from the settling chamber into the treatment moat, or from the moat into the settling chamber. A pipe 22$^f$ leads from the treatment moat for the discharge of the treated liquid if desired. A pipe 22$^g$ leads from the settling chamber for the admission or discharge of liquid to or from that chamber, if desired.

In Fig. 3, an agitating and aerating apparatus A like that illustrated in Fig. 1 is shown as being trunnioned at 26 upon a frame 27. The frame 27 is mounted upon track wheels 28 and transverse track rails 29, by which the frame 27 and the structure A may be adjusted laterally across the moat so that the tube 11$^b$, corresponding to the tube 11 of Fig. 1, may be caused to travel nearer to the inner wall of the moat than to the outer wall, or vice versa, or centrally of the moat.

The track rails 29 are in turn mounted upon bars 30, said bars being supported from the transverse beams 18$^a$, which correspond to the beams 18 of Fig. 1 and which, like said rails, are supported upon track wheels 20$^a$ and track rails 21$^a$, these elements 20$^a$ and 21$^a$ corresponding to the elements 20 and 21 of Fig. 1. In other words, the frame constituted by the members 30 and 18$^a$ is adapted to travel lengthwise of the moat, while the frame 27 is adjustable across the moat.

A conventional spring-actuated latch 31 is adapted to engage an arcuate rack 32 to hold the structure A in tipped position upon its trunnion 26, and in this case the propulsion means, such as the electric motor 24$^a$, may be omitted, and propulsion of the relatively buoyant structure A may be effected by the action of the propeller 7 as it draws the liquid to be treated into the lower end of the tube 11$^a$.

Thus, once the apparatus has been set in motion, it will continue to travel indefinitely around the tank, and since it may be adjusted from time to time to traverse different paths in the width of the tank, every portion of the liquid will be agitated, aerated, or otherwise treated.

Where the propulsion of the structure is to be mechanically effected, as by the motor 24$^a$, the degree of buoyance to be imparted by the chamber 17 will be so regulated by adjustment of the size of said chamber that there will be enough weight on the track wheels 20 to give them the necessary traction and cause them to rest firmly on the rails to an extent that they will be reasonably independent of fluctuations of water level, such as might come about from changes in rate of inflow to the aeration tank, wave action, etc.

In Figs. 4 and 5, the parts are the same as those heretofore described, and the same reference numerals have been applied, except that in this case I have added a hood-like vane 33, which catches part of the water discharged by propeller 7 for the purpose of causing bodily travel of the buoyant structure through the water. This additional aid may be in lieu of or in addition to the tilting described with respect to Fig. 3.

Figure 7:
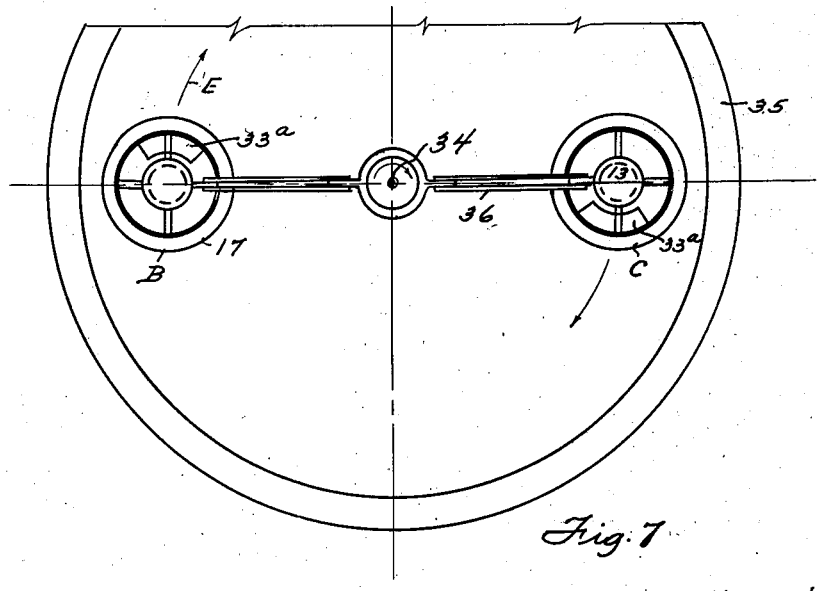
Fig. 7 is a plan view of a modified form of apparatus for use in a circular tank.

In the modified form of the invention illustrated in Fig. 7, 34 designates a central supporting pivot or post in a round tank 35. Arms 36, extending in opposite directions from and pivoted with respect to the post 34, carry the agitating structures of Figs. 4 and 5, for example, at their outer ends, said structures being indicated in a general way at B, C.

Vanes 33ª, corresponding to the vanes 33, are disposed in such positions that the structures B and C are caused to travel bodily in the direction indicated by the arrows E. This traveling movement may be effected by tilting the structures B and C as described with respect to Fig. 3, though in this simple form of the device I prefer to use the vanes 33ª. I may use power means for actuating the arms 36, if desired.

While I have illustrated both positively actuated track wheels and fluid propellers as propulsion means, it is clear that any combination of these may be resorted to without departure from the invention.

As in my previously filed application, the invention has for one of its principal objects the aeration of water supplies to render them more suitable for human consumption and for industrial use. It is also adaptable to the aeration of sewage and waste liquors to reduce their oxygen demands on bodies of water into which they are discharged and to render them less offensive. It is also contemplated that this method and apparatus may be used to mix gases, liquids or solids with water, sewage, waste liquors, and solutions containing other chemicals in order to secure a definite reaction or to drive gases from liquids.

For example, such a device as this might be used where there is excess lime in a water supply to which a high lime dosage has been applied for softening. To remove excess lime, carbon dioxide gas is mixed with this water. The gas combines with the lime in solution to form calcium carbonate, which is highly insoluble in water and readily settles out in tanks or in filters. In the manufacture of sodium nitrate, nitrogen dioxide gas may be, by this apparatus and method, kept in intimate and prolonged contact with a solution of sodium carbonate so that chemical reaction may take place.

As far as I am aware, it is new with me to provide the relatively simple and inexpensive treatment device adapted to bodily traverse and to repeatedly traverse a body of liquid to be aerated, and wherein buoyancy of some of the parts is utilized in supporting the apparatus in such lateral travel.

While the propeller has been referred to in the claims as an agitator, it is clear that since it acts to continuously break the surface tension of the liquid, it also functions as an aerator. Therefore, it is to be understood that this term "agitator" is to be generically construed to include any element mounted to bodily travel through the body of the liquid and to function as an agitator and/or aerator.

Consequently, it is to be understood that the invention is not limited to the precise construction set forth, but that it includes within its purview whatever changes fairly come within either the terms or the spirit of the appended claims.

Having described my invention, what I claim is:

1. A unit for a structure of the character described, comprising a substantially vertically disposed shaft, a propeller upon said shaft, a frame in which said shaft is mounted, a buoyant element supported from said frame and surrounding the propeller and free to float laterally, the propeller being disposed to lie at a point below but relatively close to the level of the liquid in which the buoyant element rests, a ring surrounding the propeller and located within the buoyant element and projecting above the level of the liquid to prevent the flow of liquid laterally to the propeller, a depending tube extending below the buoyant element and constituting the only point of ingress for liquid to the propeller, and means supported upon the frame for driving the propeller.

2. A unit for a structure of the character described, comprising a vertically disposed shaft, a propeller upon said shaft, a frame in which said shaft is mounted, a buoyant element supported from said frame and surrounding the propeller, the propeller being disposed to lie at a point below the level of the liquid in which the buoyant element rests, a ring surrounding the propeller and located within the buoyant element and projecting above the level of the liquid to prevent the flow of liquid laterally to the propeller, a depending tube extending below the buoyant element and constituting the only point of ingress for liquid to the propeller, means supported upon the frame for driving the propeller, and a downwardly acting propeller upon the frame and above the level of the liquid in which the buoyant element is disposed.

3. A structure of the character described comprising a substantially vertical shaft, a frame in which said shaft is supported, means for driving said shaft, an upwardly acting propeller upon said shaft, a buoyant annular chamber surrounding said shaft and connected to and supporting said frame and of enough larger diameter than the propeller to leave a considerable space between the propeller and said chamber, and a vane within said space shaped and positioned to catch the lateral thrust of the liquid from the propeller and to be propelled laterally thereby along with the buoyant chamber, shaft and propeller through a body of liquid to be treated.

4. A buoyant structure adapted to float to varying positions within a tank containing liquid to be treated; said structure comprising a float, an upwardly acting agitator, a driving means for the agitator, said agitator and driving means being supported by the float, and said agitator being disposed at such a point below the surface of the liquid as to continuously break the surface tension thereof by forcing some of the liquid above the liquid level, and means for imparting bodily lateral travel to the structure as a result of the movement of liquid past the agitator comprising a vane supported from the float and located to be contacted by the liquid forced upwardly by the agitator, said vane being of such a shape as to cause propulsion of the structure by the reactive force of the liquid impinging thereon.

5. The herein described method which consists of successively and laterally traversing a large body of liquid with a structure acting to throw fresh portions of the liquid above the surface of the body of liquid in the form of an inverted cone to break the surface tension thereof, while simultaneously discharging a forcibly propelled column of gas, downward upon and into that portion of the liquid being thrown above the surface, for the purpose of treating and modifying the condition of such liquid.

6. The combination with a tank, of a traveling carriage, cooperating means carried by the tank and carriage for guiding the carriage to travel along said tank, and agitating mechanism carried by the carriage and projecting downwardly into the tank to a point below the normal liquid level in the tank, said agitating mechanism comprising a frame, a shaft, a propeller upon the shaft, and means for driving said propeller, said propeller acting to throw liquid within the tank upwardly above the normal liquid level, and means for mounting the frame, shaft and propeller for bodily tilting with respect to the traveling carriage, whereby when the agitating mechanism is tipped to lie at an angle with respect to the vertical, the action of the propeller upon the liquid in forcing said liquid above the liquid level also acts to impart bodily traveling movement to the agitator to thereby continuously bring said agitator into contact with fresh portions of the body of liquid to be treated.

7. The combination with a tank of a traveling carriage, means carried by the carriage and tank for supporting and guiding the carriage for travel lengthwise of said tank, means for propelling said carriage lengthwise of the tank, a traveling frame mounted upon said carriage for movement laterally of the line of travel of the carriage, an agitating structure trunnioned for tilting movement upon said frame, means for holding said structure against movement with respect to the frame when tilted to varying degrees of inclination, said structure comprising a frame, a motor housing upon the frame, a buoyant annular float chamber secured to the lower end of said frame, a tube depending from the underside of said frame, open at its bottom and communicating at its top with the space that is surrounded by said buoyant chamber, a motor within said motor housing, a shaft extending axially of the frame and driven by said motor, and an aerating propeller carried by said shaft, said aerating propeller and shaft being in axial alignment with said tube and said propeller being at such point as to be submerged in liquid within the tank, whereby when the aerating structure is tilted upon its trunnions to tip said shaft and its propeller to a position of inclination with respect to the vertical, the action of the propeller upon the liquid moves the agitating structure, and the frame by which it is carried, along said track.

8. A structure of the character described, comprising a substantially vertical shaft, a frame in which said shaft is supported, means for driving said shaft, an upwardly acting propeller upon said shaft, a buoyant annular chamber surrounding said shaft and upon which said frame is mounted and supported, said chamber being of enough larger diameter than the propeller to leave a considerable space between the propeller and the inner wall of said chamber, baffles within said space, shaped and positioned to prevent swirling action of the liquid under the action of the agitator and aerator, a tubular member axially aligned with said shaft and attached to, and projecting to a point materially below said annular chamber, said tubular member constituting an intake for delivering liquid to the space enclosed by the buoyant chamber, said space being closed at its bottom against the entry of liquid to said space except through said tubular member.

9. The combination with a tank, containing a body of liquid to be treated, of a supporting frame, means for mounting said supporting frame for movement over the surface of the said body of liquid, an agitating propeller carried by said frame, a motor carried by said frame for driving said propeller, and means for holding said propeller within the body of liquid in such juxtaposition to the surface thereof and at such an inclined position that when the propeller is driven by its motor, it acts to perform the double function of thrusting the liquid upwardly to continuously break the surface tension thereof and of causing bodily lateral travel of the frame continuously to fresh portions of the liquid to be treated.

10. A structure as recited in claim 9 in combination with means supported by the frame and traveling bodily therewith, acting to discharge a treating gas downwardly upon the body of liquid at the point where its surface tension is being broken by the action of the propeller.

11. A device of the character described comprising a vertical shaft, an upwardly acting propeller thereon positioned to be submerged in the body of liquid to be treated, an annular float surrounding the propeller, a motor for driving the shaft, a supporting frame for the motor and shaft, said motor, shaft, frame and float being connected to move bodily together, a downwardly extending tube projecting below and supported by the float, through which liquid is drawn from a point below the float to the interior of the space that is surrounded by the float, and a vane mounted upon the float within said space and so shaped and so positioned with respect to the propeller as to effect bodily propulsion of the float and the parts carried thereby, under the action of the liquid thrown from the propeller.

12. An agitating and aerating structure to be propelled laterally through a body of liquid, comprising a frame, a substantially vertical shaft mounted in said frame, means for driving said shaft, a buoyant member surrounding the shaft and supporting the frame, and means for maintaining the buoyant member, shaft and propeller at an angle with respect to the vertical, and with the propeller submerged in the liquid to thereby cause the propeller to propel the structure laterally through the body of liquid during the action of the propeller.

GILBERT C. UNGER, Jr.